US010346187B1

(12) United States Patent
Trier et al.

(10) Patent No.: US 10,346,187 B1
(45) Date of Patent: Jul. 9, 2019

(54) BOARD MANAGEMENT CONTROLLER FIRMWARE EMULATION

(71) Applicant: Amazon Technologies, Inc., Seattle, WA (US)

(72) Inventors: Stephen Christopher Trier, Bothell, WA (US); Aaron Joseph Coon, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 38 days.

(21) Appl. No.: 15/475,035

(22) Filed: Mar. 30, 2017

(51) Int. Cl.
*G06F 9/00* (2006.01)
*G06F 9/24* (2006.01)
*G06F 15/177* (2006.01)
*G06F 9/455* (2018.01)
*G06F 8/71* (2018.01)
*G06F 8/656* (2018.01)

(52) U.S. Cl.
CPC .............. *G06F 9/455* (2013.01); *G06F 8/656* (2018.02); *G06F 8/71* (2013.01)

(58) Field of Classification Search
CPC ........................................................ G06F 9/455
See application file for complete search history.

(56) References Cited

U.S. PATENT DOCUMENTS 9,367,419 B2 * 6/2016 Bhatia ...................... G06F 13/42
2017/0206110 A1 * 7/2017 Huang ................. G06F 9/45558

OTHER PUBLICATIONS

Willis, "OpenBMC, a distribution for baseboard management controllers," downloaded from https://lwn.net/Articles/683320/, 6pp. (document published Apr. 12, 2016).
John MacInnis, "Implementing Firmware on Embedded Intel Architecture Designs," (Jan. 2009), 26 pages [retrieved from https://digitallibrary.intel.com/content/dam/ccl/public/ia-firmware-implementation-paper.pdf?token=eyJhbGciOiJIUzI1NiIsInR5cCI6IkpXVCJ9.eyJjb250ZW50SWQiOiI2MDA0MTEiLCJlbnRlcnByaXNISWQiOiI3Ni4yNi4xOTIuMTAyIiwiQUNDVF9OTSI6IiIsIkNOREFfTkJSIjoiIiwiaWF0IjoxNTQxNDU1NDc0fQ.YuZl72oIDJGW3O1Z01a1HvAq73Fv94hS-e_OgvorLc on Nov. 5, 2018].
Sun et al., "Embedded Firmware Solutions," pp. xxiv-xxv and 13-24 (2015), 215 pages, [retrieved from https://link.springer.com/content/pdf/10.1007%2F978-1-4842-0070-4_2.pdf on Nov. 5, 2018].

* cited by examiner

*Primary Examiner* — Mohammed H Rehman
(74) *Attorney, Agent, or Firm* — Klarquist Sparkman, LLP

(57) ABSTRACT

Technologies are provided for running multiple firmware instances in a board management controller (BMC). A BMC can be configured to execute a first BMC firmware natively and to execute a virtualized second BMC firmware in an emulator. The virtualized second BMC firmware can be an instance of an older BMC firmware, and the first BMC firmware can be an instance of a newer BMC firmware configured to use the emulator to delegate control of hardware components it does not support to the instance of the older firmware. As the newer firmware is updated to support additional hardware components, the instance of the older firmware's control of those components can be disabled. BMC commands can be received and routed to the multiple firmware instances that support them for processing.

20 Claims, 13 Drawing Sheets

US 10,346,187 B1

BOARD MANAGEMENT CONTROLLER FIRMWARE EMULATION

BACKGROUND

Many computer motherboards include board management controllers (BMCs)—microcontrollers that can be used to monitor, and in some cases manage, computer hardware components attached to the motherboards. A BMC is normally programmed using a firmware that configures the BMC for performing out-of-band (e.g., outside of a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration. The BMC firmware is usually proprietary and is often shipped with the BMC by the computer vendor.

DETAILED DESCRIPTION

Traditionally it has been difficult to update or enhance BMC firmware. BMC firmware is typically deployed as a firmware image (i.e., a binary large object, or "blob," that contains executable instructions for a BMC operating system and all supported BMC functionality). To deploy an updated firmware image, using current methodologies, usually requires overwriting the previously installed BMC firmware image. This means that, to develop a BMC firmware update, all functionality of the old BMC firmware is usually completely replaced. This can make testing new BMC firmware functionality difficult because the previous BMC firmware is usually completely replaced by the new firmware before new features can be tested. It can also significantly increase development time in scenarios where the object is only to replace or add a small number of BMC features, and not to completely replace the previous BMC firmware.

At least some of the embodiments of the technologies described herein solve these problems by enabling multiple virtualized BMC firmware instances to be executed in a single BMC.

For example, a BMC can be configured to run multiple different BMC firmware instances in separate virtual machines or virtualization containers. The BMC can include a virtualization controller (such as a hypervisor or virtualization container manager) for managing interactions between the virtualized BMC firmware instances, and between the virtualized BMC firmware instances and hardware resources connected to the BMC. Different virtualized BMC firmware instances can be used to monitor and manage different hardware resources connected to the BMC, and to implement different BMC features. A command that is received at the BMC can be routed to one of the multiple virtualized BMC firmware instances that supports the command.

In a particular example, a previous version of a BMC firmware can be run as one virtualized firmware instance, and a new version of the BMC firmware can be run in another virtualized firmware instance. The virtualized firmware instance of the new BMC firmware version can be used to perform BMC functionality that it supports, and the virtualized firmware instance of the previous BMC firmware version can be used to perform BMC functionality that is not supported by the new version.

In another embodiment, a BMC can be configured to run a first BMC firmware instance natively and to run a virtualized version of a second firmware instance using an emulator. The first BMC firmware instance can be configured to control and/or communicate with some hardware resources connected to the BMC and to delegate control of and/or communication with other hardware resources connected to the BMC to the virtualized version of the second firmware instance running in the emulator. A command that is received at the BMC can be processed by the first firmware instance running natively or routed to the virtualized version of the second firmware instance running in the emulator.

Figure 1:
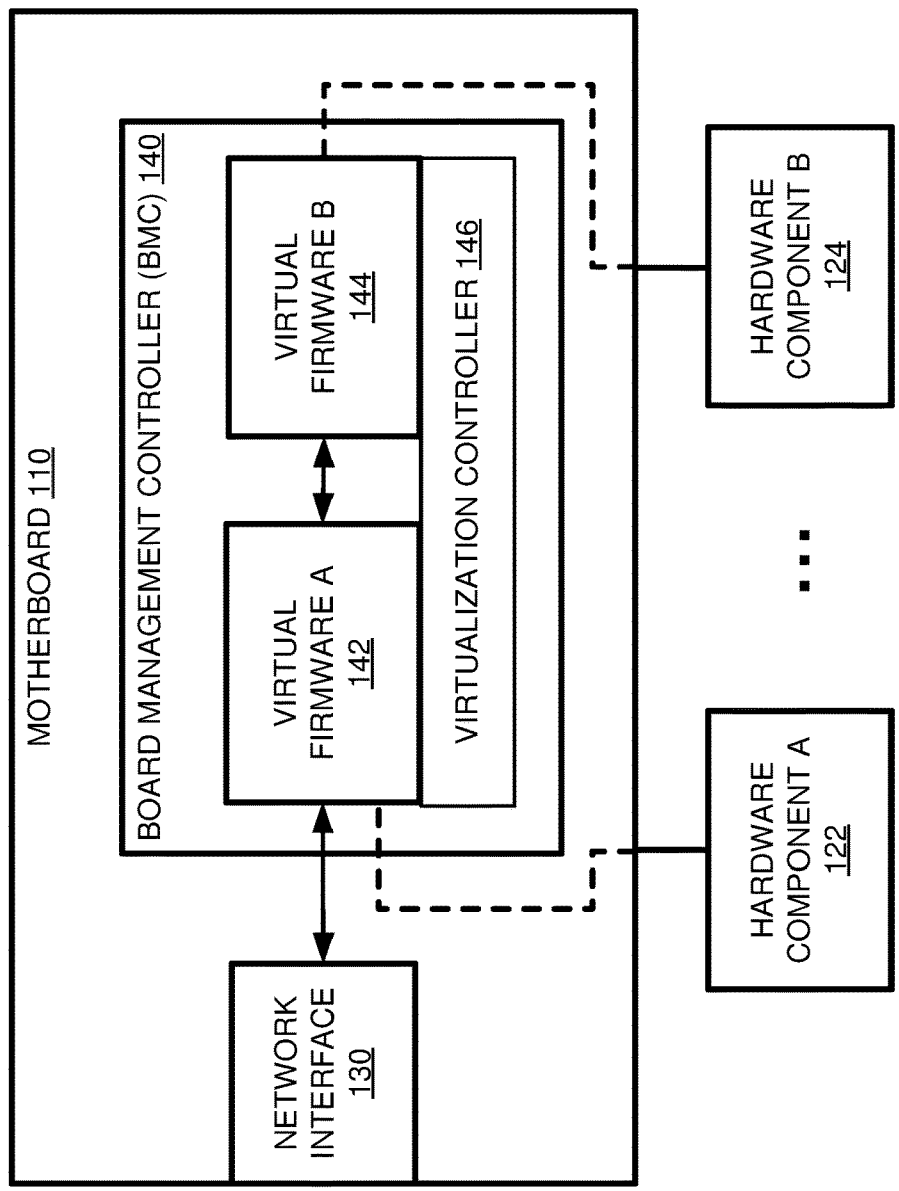
FIG. 1 is a system diagram depicting an example system configured to run multiple virtualized firmware instances in a board management controller (BMC).

FIG. 1 is a system diagram depicting an example system 100 configured to run multiple virtualized firmware instances in a board management controller (BMC). The example system 100 includes a motherboard 110 connected to multiple hardware components 122-124. The motherboard 110 comprises a network interface 130 and a BMC 140. The BMC comprises a BMC processor (not shown), a virtualization controller 146, a first virtualized BMC firmware 142, and a second virtualized BMC firmware 144. The first virtualized BMC firmware 142 is configured to control a first hardware component 122, and to delegate control of a second hardware component 124 to the second virtualized BMC firmware 144. Generally, when this application refers to firmware "controlling" a hardware component, it should be understood that the firmware could also simply communicate with the hardware component, unless stated otherwise. Controlling the hardware component includes communicating with the hardware component.

In at least some embodiments, the first virtualized BMC firmware 142 and/or the second virtualized BMC firmware 144 can control multiple hardware components connected to the motherboard. For example, the second virtualized BMC firmware 144 can be an instance of an older BMC firmware that supports control of the multiple hardware components 122-124 and the first virtualized BMC firmware 142 can be an instance of a newer BMC firmware that does not yet support control of all of the hardware components 122-124 (such as a BMC firmware that is still in development). The first virtualized BMC firmware 142 can be used to control the hardware components that it supports (e.g., 122) and the second virtualized BMC firmware 144 can be used to control the hardware components that the first virtualized BMC firmware 142 does not yet support (e.g., 124).

The first virtualized BMC firmware 142 and the second virtualized firmware 144 can comprise separate virtual machines configured to execute different BMC firmware instances. In such an embodiment, the virtualization controller 146 can comprise a hypervisor configured to manage the separate virtual machines. Alternatively, the first virtualized BMC firmware 142 and the second virtualized firmware 144 can comprise separate virtualization containers configured to execute different BMC firmware instances. In such an embodiment, the virtualization controller 146 can comprise an operating system of the BMC configured to manage the virtualization containers. For example, the virtualization controller 146 can comprise one or more modules of a BMC operating system (such as a Linux kernel) configured to support operating system-level virtualization.

The virtualization controller 146 can facilitate access to the underlying hardware components connected to the BMC 140 and to the motherboard 110. The virtualization controller 146 can also facilitate communication between the first virtualized BMC firmware 142 and the second virtualized BMC firmware 144.

The first virtualized BMC firmware 142 can be configured to receive a command via the network interface 130 of the motherboard 110. In at least one embodiment, the received command can be an Intelligent Platform Management Interface (IPMI) command. The first virtualized BMC firmware 142 can be configured to determine whether or not it supports the received command. For example, the first virtualized BMC firmware 142 can analyze the command to determine whether processing the command requires access to one of the multiple hardware components 122-124 that it controls. Additionally or alternatively, the first virtualized BMC firmware 142 can inspect a predefined list of supported commands to see if the received command is included in the list. Such a predefined list can be stored as part of the first virtualized BMC firmware 142. If the first virtualized BMC firmware 142 supports the command, then the first virtualized BMC firmware 142 can process the received command. Processing the received command can comprise accessing one or more hardware components controlled by the first virtualized BMC firmware 142 (e.g., 122). Additionally or alternatively, the first virtualized BMC firmware 142 can transmit a response message via the network interface 130.

If the first virtualized BMC firmware 142 does not support the received command, then the first virtualized BMC firmware 142 can transmit the command to the second virtualized BMC firmware 144. The second virtualized BMC firmware 144 can be configured to process the command using one or more of the hardware components that it controls (e.g., 124) and/or transmit a response message back to the first virtualized BMC firmware 142. The first virtualized BMC firmware 142 can be configured to receive the response message from the second virtualized BMC firmware 144 and to transmit all or part of the response message via the network interface 130.

In at least some embodiments, the virtualization controller 146 can be configured to facilitate the communication between the first virtualized BMC firmware 142 and the second virtualized BMC firmware 144. For example, the virtualization controller 146 can simulate a communication bus between the first virtualized BMC firmware 142 and the second virtualized BMC firmware 144. Additionally or alternatively, the virtualization controller 146 can emulate a network interface to which the second virtualized BMC firmware 144 establishes a connection. This can allow the second virtualized BMC firmware 144 to operate as if it were directly connected to a network interface of the motherboard 110, when in fact the commands it receives are transmitted by the first virtualized BMC firmware 142 and the responses it transmits are routed to the first virtualized BMC firmware 142.

In any of the examples described herein, a board management controller (BMC) can be a microcontroller or microprocessor connected to a motherboard (or baseboard) and configured to manage one or more hardware components connected to the motherboard. A board management controller can also be referred to as a "baseboard management controller." The BMC can comprise a processing unit (such as an ARM processing unit), but is separate from a central processing unit (CPU) connected to the motherboard. The BMC can be configured to monitor sensors connected to the BMC that track system parameters, such as CPU temperature, fan speed, system power supply status, various operating system parameters, etc. The BMC can be connected to a network interface and can transmit messages via the network interface. For example, when a given sensor value has exceeded a specified value, the BMC can transmit an alarm message via the network interface. In at least some embodiments, the BMC can be connected to a separate management network that can be accessed by system administrators for performing out-of-band system maintenance operations.

The BMC can be configured to run multiple virtualized BMC firmware instances side-by-side. The BMC can execute an operating system kernel (such as a Linux kernel) that can be configured to run multiple BMC firmware instances in separate virtual machines or virtualization containers. As described herein, one virtualized BMC firmware instance can be used to monitor and/or control one or more hardware components and/or perform one or more BMC features, while another virtualized firmware instance can be used to monitor and/or control one or more different hardware components and/or perform one or more different BMC features.

In any of the examples described herein, a firmware can be software that provides control and/or monitoring of one or more computer hardware components. A BMC firmware can comprise executable instructions that, when executed by a BMC processor, cause a BMC containing the BMC processor to monitor and/or control one or more hardware components connected to a motherboard to which the BMC is attached. A virtualized BMC firmware (or a virtualized BMC firmware instance) can comprise a BMC firmware that is being executed within a virtual machine or virtualization container within a BMC. In at least some embodiments, a virtualized BMC firmware can be executed by an emulator running in a BMC.

Figure 2:
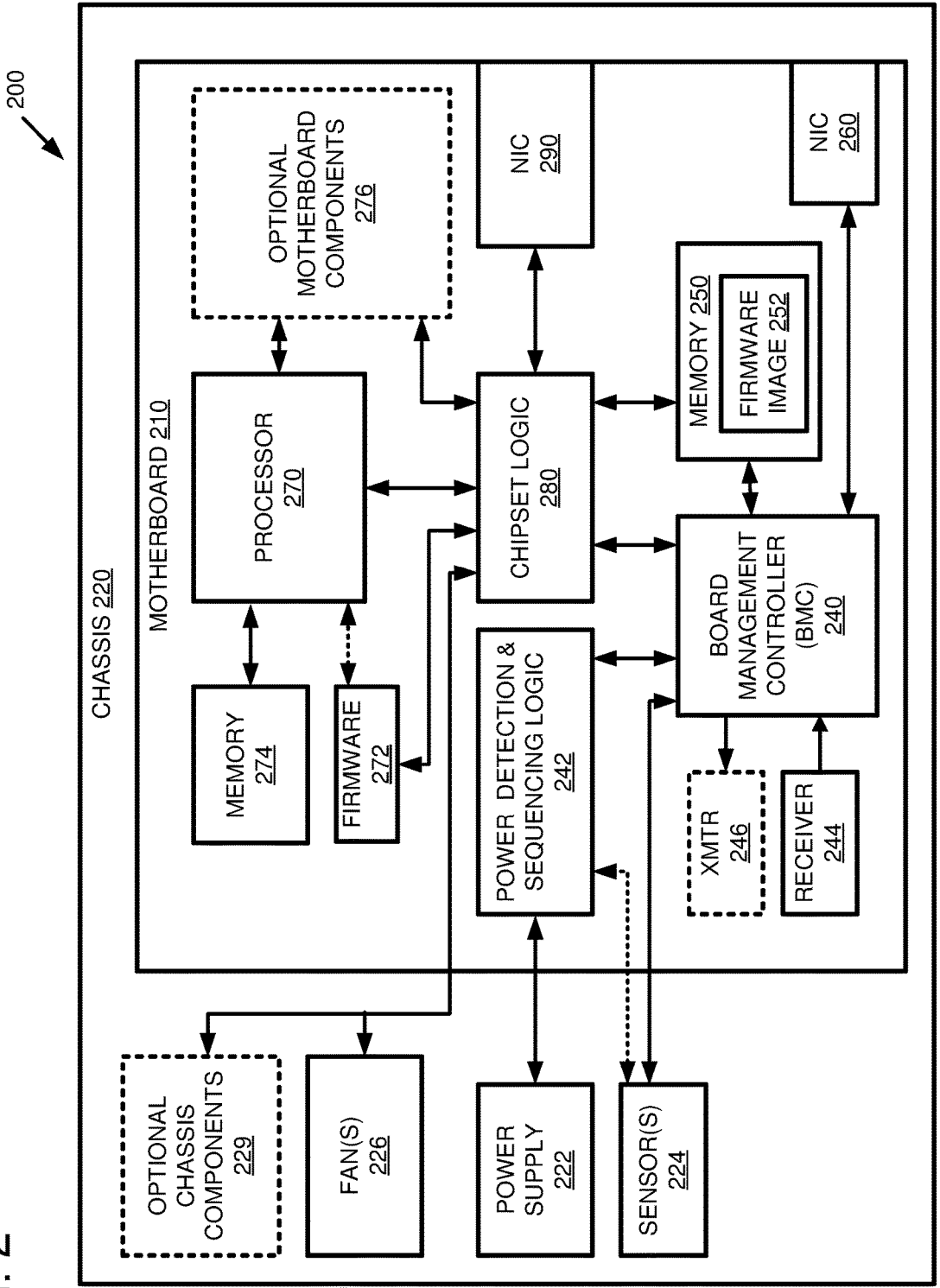
FIG. 2 is a system diagram depicting an example computing system comprising a BMC.

FIG. 2 is a system diagram depicting an example computing system 200 comprising a board management controller (BMC) 240. The example computing system 200 comprises a motherboard 210 and a chassis 220. The chassis 220 can include a power supply 222, one or more sensors 224, one or more fans 226, and optional chassis components 229. The motherboard 210 can include a set of components that are common across multiple computing systems so that the motherboard 210 can be used in multiple different computing systems. The motherboard 210 and additional components, such as optional motherboard components 276, can be installed within the chassis 220.

The computing system 200 can be connected to other components of a datacenter and power can be applied, such as by connecting the computing system 200 to an AC power source and/or toggling a power switch (not shown) of the chassis 220. The power supply 222 can convert energy from an alternating current to direct current energy that can be used to power the components of the chassis 220 and the motherboard 210. The power supply 222 can have multiple outputs that can be controlled independently of each other. The outputs of the power supply 222 can be at different voltages and/or connected to different components within the computing system 200. For example, different outputs of the power supply can be sequenced so that some components of the computing system 200 are powered on before other components of the computing system 200.

Power detection and sequencing logic 242 can be used to detect when the power supply outputs are within stable operating parameters. For example, after the power is initially switched on, it can take time for one or more of the power supply outputs to ramp to an appropriate output voltage. The power detection and sequencing logic 242 can sense the voltage of the power supply outputs and can indicate when the voltage is within operational parameters (such as within +/−10% of a predefined voltage). Additionally or alternatively, the voltage sensors can be integrated within the power supply 222 or on the chassis (e.g., sensors 224) and the voltage sensors can communicate with the power detection and sequencing logic 242. When a power supply output transitions to an operational state, the power detection and sequencing logic 242 can perform a power-up sequence and/or a reset sequence. For example, power can be applied to one portion of the motherboard before other portions of the motherboard. As another example, one portion of the motherboard can be placed in or taken out of reset at a different time than a different portion of the motherboard. As a specific example, the board management controller 240 and its associated components can be brought out of reset (e.g., a reset signal connected to the board management controller 240 can be deasserted) before a host CPU (such as processor 270).

The retrieved configuration software can be stored in non-volatile memory that is directly or indirectly accessible by the board management controller 240 and/or the processor 270. For example, the configuration software can be software modules that are stored in firmware 252 and/or firmware 272. The firmware 252 and 272 can be used to control one or more components integrated with or controlled by the motherboard (such as components of the chassis 220). For example, the firmware 272 can include fan control software which, when executed by the processor 270, can be used to control the operation of one or more fans 226 within the chassis 220.

The board management controller 240 can communicate with the processor 270 and other motherboard components via chipset logic 280. The chipset logic 280 can be used to manage communications between the processor 270 and other components of the motherboard 210 and the chassis 220. For example, the chipset logic 280 can include one or more bridges for converting between different signaling protocols. As a specific example, the processor 270 can communicate with the chipset logic 280 using a high-speed front-side bus and a network interface card (NIC) 290 can communicate with the chipset logic 280 using an input/output (TO) protocol, such as peripheral component interconnect (PCI), or PCI-Express. The chipset logic 280 can convert between and manage communications between the different protocols so that the processor 270 can communicate with the NIC 290 through the chipset logic 280.

The processor 270 and the board management controller 240 can operate using a distributed computing model, where the processor 270 and the board management controller 240 each have private memory and they can communicate by passing messages to each other. The processor 270 and the board management controller 240 can have one or more areas of shared memory where messages and/or data can be passed by writing to the shared memory. Generally, the processor 270 and the board management controller 240 have private areas of memory and can execute different programs, such as different operating systems. For example, the processor 270 can execute programs that are resident in memory 274 and/or firmware 272 and the board management controller can execute programs that are resident in memory 250. The firmware image 252 stored in the memory 250 can comprise instructions that, when executed by the BMC 240, launch a virtualization controller and two separate virtualized BMC firmware instances within the BMC. The separate virtualized BMC firmware instances can be configured to monitor and control the various chassis components and/or motherboard components described herein.

The separate virtualized BMC firmware instances can be configured to perform various BMC features, such as out-of-band system management operations. Example BMC features include implementing all or part of an intelligent platform management interface (IPMI) protocol, implementing all or part of a systems management architecture for server hardware (SMASH) protocol, implementing all or part of a simple network management (SNMP) protocol, implementing all or part of the DMTF Redfish API, monitoring sensors, controlling fan speeds, logging and/or transmitting alarm signals, operating as a VGA controller, performing modem management operations, performing keyboard-mouse-video (KMV) emulation, etc.

The processor 270 can be powered on and/or reset at a different time than the board management controller 240. For example, the board management controller 240 can be powered on and/or brought out of reset before the processor 270. As one example, the board management controller 240 can update the firmware 272 and/or other configuration software used by the processor 270 while the processor 270 is powered down and/or in a reset state. As another example, the board management controller 240 can read and/or download configuration software and/or settings before the processor 270 is brought out of reset. The configuration software and/or settings can be provided to a BIOS routine executing on the processor 270 after the processor 270 is brought out of reset.

The processor 270 and the board management controller 240 can communicate over independent networks. For example, the board management controller 240 can communicate primarily over a management network using the NIC 260 and the processor 270 can communicate primarily over a production network using the NIC 290. The NICs 260 and 290 can have different MAC addresses and can be cabled to different routers. By providing a capability to communicate over multiple networks, redundant communication channels can be provided, and management activities can be communicated over a management plane and communications associated with computing services can be communicated over a data plane that is separate from the management plane.

The board management controller 240 can be configured to boot an operating system (such as a Linux kernel) stored in the memory 250. The operating system can be part of the firmware image 252. The operating system can be configured to launch a virtualization controller, instantiate a first virtualized firmware in the baseboard management controller 240, and instantiate a second virtualized firmware in the baseboard management controller 240. In an embodiment where the virtualization controller comprises a hypervisor, instantiating a virtualized firmware can comprise starting a virtual machine that is managed by the hypervisor and is configured to run an instance of a BMC firmware. In an embodiment where the virtualization controller comprises part of an operating system configured to support operating system-level virtualization, instantiating a virtualized firmware can comprise launching a virtualization container that is configured to run an instance of a BMC firmware.

Figure 3:
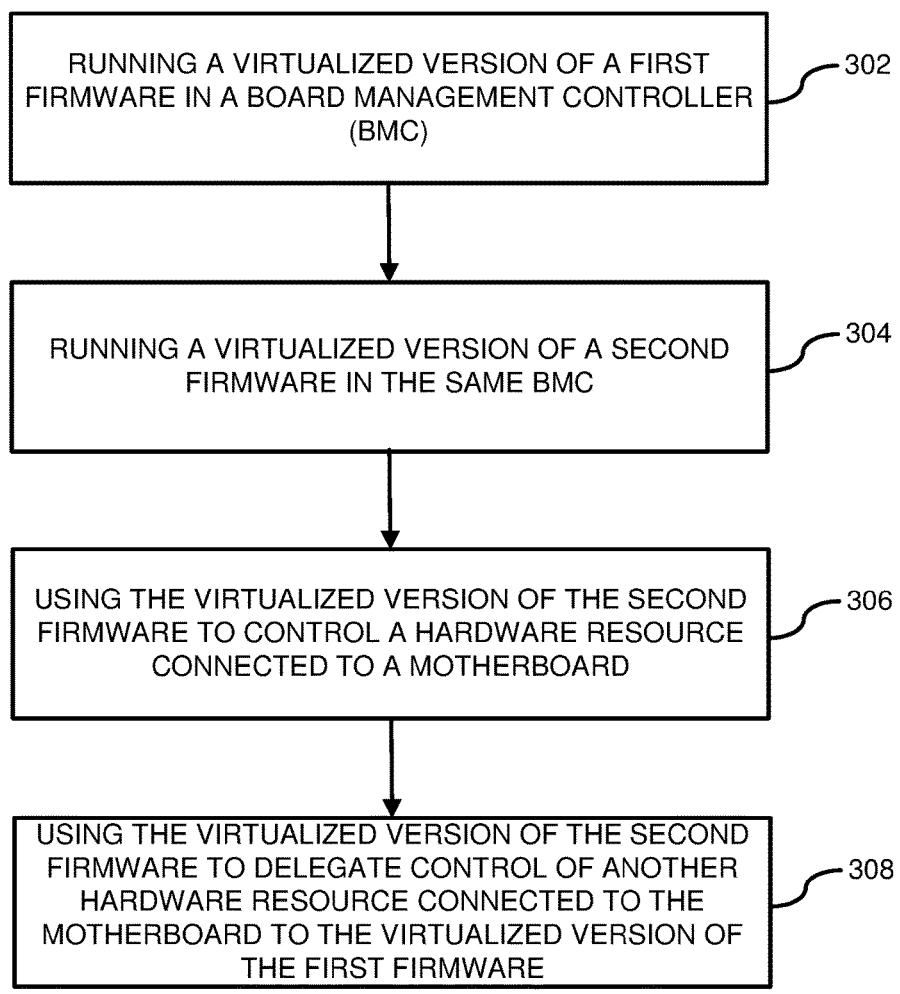
FIG. 3 is a flowchart of an example method for managing hardware components using two virtualized versions of a firmware running side-by-side in a BMC.

FIG. 3 is a flowchart of an example method 300 for managing hardware components connected to a motherboard using virtualized versions of different firmware instances running side-by-side in a BMC. Any of the example systems described herein can be used to perform the example method 300.

At 302, a virtualized version of a first firmware is run in a BMC. Running the virtualized version of the first firmware can comprise loading a first firmware image from a storage location accessible to the BMC into a virtual machine or virtualization container running in the BMC. The virtual machine or virtualization container can be created and managed by a virtualization container running within the BMC.

At 304, a virtualized version of a second firmware is run in the same BMC. Running the virtualized version of the second firmware in the BMC can comprise loading a second firmware image from the same storage location, or a different storage location, accessible to the BMC into a separate virtual machine or virtualization container running in the BMC. The virtualized version of the second firmware and the virtualized version of the first firmware can be run side-by-side in the BMC. For example, a same virtualization controller can be used to launch and manage both the virtualized version of the first firmware and the virtualized version of the second firmware in separate virtual machines or separate virtualization containers.

In at least some embodiments, a single BMC firmware image is loaded that comprises the images for both the first BMC firmware and the second BMC firmware. The single BMC firmware image can further comprise instructions for launching the virtualization controller and instantiating the separate virtual machines (or separate virtualization containers) using the images for the first BMC firmware and the second BMC firmware.

At 306, the virtualized version of the second firmware is used to control a hardware resource connected to the motherboard. The hardware resource can be a sensor or some other hardware component connected to the BMC. The virtualized version of the second firmware can be configured to access the hardware resource via one or more emulated connections provided by the virtualization controller. For example, the virtualization controller can be configured to monitor a physical connection between the hardware resource and the BMC, and to transmit signals between the hardware resource and the virtualized version of the second firmware via the one or more emulated connections.

In at least one embodiment, a command can be received at the BMC to access a given hardware resource connected to the motherboard. The virtualized version of the second firmware can be used to determine whether the virtualized version of the second firmware supports the given hardware resource. For example, the virtualized version of the second firmware can inspect a data structure (such as a table, list, map, etc.) describing hardware resources supported by the virtualized version of the second firmware and determine whether the data structure describes the given hardware resource. If the virtualized version of the second firmware supports the given hardware resource, then the virtualized version of the second firmware is used to process the given command.

At 308, the virtualized version of the second firmware is used to delegate control of another hardware resource connected to the motherboard to the virtualized version of the first firmware. In at least some embodiments, the virtualized version of the second firmware can be a newer firmware that does not support all necessary BMC functionality, and the virtualized version of the first firmware can be an older firmware whose functionality is gradually being replaced by the new or firmware. In such an embodiment, the virtualized version of the second firmware can control a hardware resource connected to the motherboard, for which it has support, and can delegate control of another hardware resource for which it does not have support to the virtualized version of the first firmware.

In an embodiment where the virtualized version of the second firmware is used to determine whether a received command is supported by the virtualized version of the second firmware, if the virtualized version of the second firmware does not support the command then the virtualized version of the first firmware can be used process the command instead. For example, the virtualized version of the second firmware can transmit the command to the virtualized version of the first firmware and can receive a response from the virtualized version of the first firmware after the command has been processed.

Figure 4:
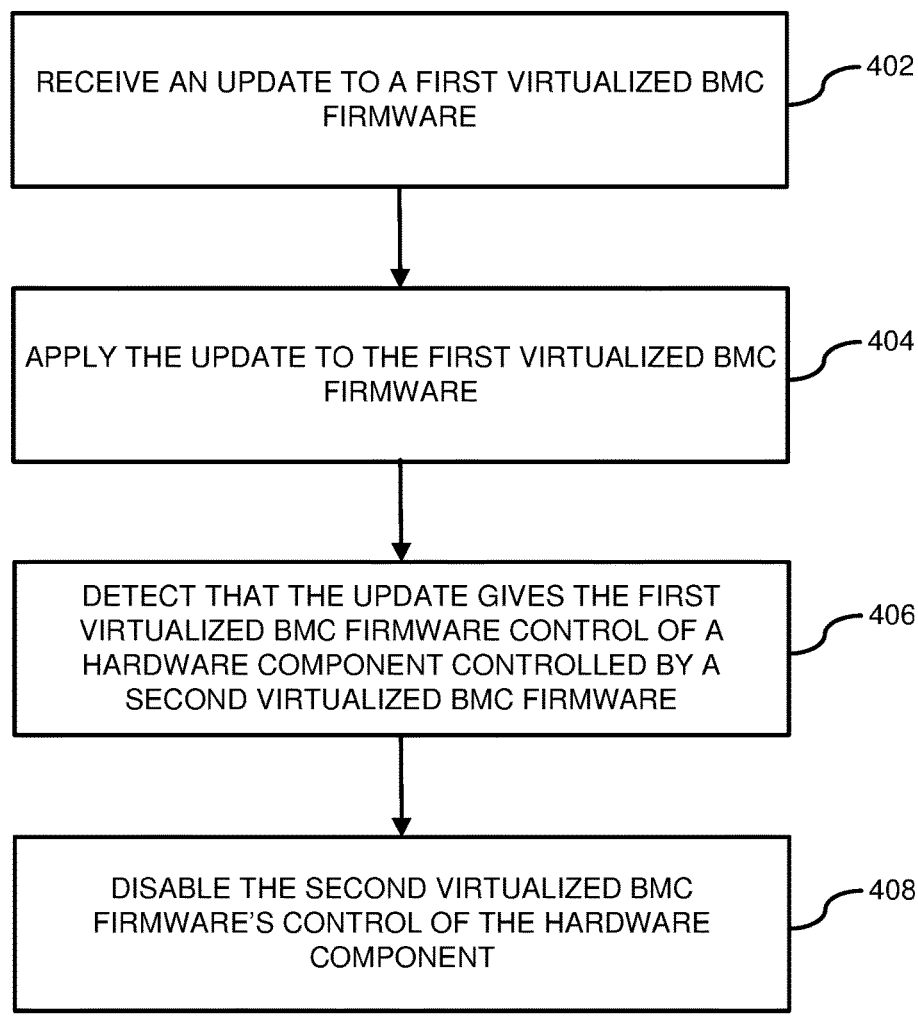
FIG. 4 is a flowchart of an example method for deploying a new version of a virtualized firmware to a BMC.

FIG. 4 is a flowchart of an example method 400 for deploying a new version of a virtualized firmware instance to a BMC configured to run two separate virtualized BMC firmware instances. Any of the example systems described herein can be used to perform the example method 400.

At 402, an update to a first virtualized BMC firmware is received by the BMC. The update can be received by the BMC via a network interface of a motherboard to which the BMC is connected. In at least one embodiment, the update can be received from a BMC firmware management service running on a server computer connected to the network interface of the motherboard via a computer network. The BMC firmware management service can be configured to detect the current version of the first virtualized BMC firmware and to deploy the update to the first virtualized BMC firmware to the BMC via the network interface of the motherboard.

In at least one embodiment, the update can comprise a new firmware image that comprises an updated version of the first virtualized BMC firmware and a current version of a second virtualized BMC firmware. For example, the new firmware image contained in the update can include an operating system kernel, instructions for launching the current version of the second virtualized BMC firmware in a virtual machine or virtualization container, and instructions for launching the updated version of the first virtualized BMC firmware in a separate virtual machine or virtualization container. Alternatively, the update can comprise only changes to the first virtualized BMC firmware. For example, the update can include a virtual machine or virtualization container image for the first virtualized BMC firmware that can be loaded by a virtualization controller running in the BMC.

At 404, the update is applied to the first virtualized BMC firmware. In an embodiment where the update comprises a new firmware image that comprises an updated version of the first virtualized BMC firmware and a current version of the second virtualized BMC firmware, the update can be applied by overwriting a current firmware image for the BMC with the new firmware image contained within the update, and rebooting the BMC to load the new firmware image. In an embodiment where the update comprises only changes to the first virtualized BMC firmware, the changes can be applied to the first virtualized BMC firmware and the first virtualized BMC firmware can be reloaded. For example, in an embodiment where the update comprises a new virtual machine or virtualization container image for the first virtualized BMC firmware, the new virtual machine image or virtualization container image can be stored in a storage location accessible by the BMC, the virtual machine or virtualization container running the current version of the first virtualized BMC firmware can be shut down, and a new virtual machine or virtualization container can be launched using the new virtual machine image or virtualization container image, respectively.

At 406, the updated version of the first virtualized BMC firmware detects that the update gave the first virtualized BMC firmware control of a hardware component controlled by the second virtualized BMC firmware. It can be problematic for both virtualized BMC firmware instances to attempt to control the same hardware component. For example, if both virtualized BMC firmware instances attempt to control a same fan, such as by setting different fan speeds, the fan's rotation could become erratic and possibly result in damage to the fan components and/or other heat-sensitive components. Disabling the second virtualized BMC firmware's control of hardware components that are controlled by the first virtualized BMC firmware, as described below, can help to avoid such issues.

Detecting that a same hardware component is controlled by both the updated version of the first virtualized BMC firmware and the second virtualized BMC firmware can comprise identifying various hardware components controlled by both virtualized BMC firmware instances. For example, the updated version of the first virtualized BMC firmware and the second virtualized BMC firmware can comprise feature manifests that identify controlled hardware components. The feature manifests of the updated version of the first virtualized BMC firmware and the second virtualized BMC firmware can be inspected to identify hardware components controlled by both the updated version of the first virtualized BMC firmware and the second virtualized BMC firmware. Alternatively, the detecting can comprise identifying a hardware component controlled by the updated version of the first virtualized BMC firmware that was not controlled by the previous version of the first virtualized BMC firmware.

At 408, the updated version of the first virtualized BMC firmware disables the second virtualized BMC firmware's control of the hardware component. In at least one embodiment, the updated version of the first virtualized BMC firmware is configured to transmit a message to the second virtualized BMC firmware, instructing the second virtualized BMC firmware to disable its control of the hardware component. In a different or further embodiment, the updated version of the first virtualized BMC firmware can be configured to transmit instructions to a virtualization controller to disable an emulated connection between the second virtualized BMC firmware and the hardware component. Additionally or alternatively, the updated version of the first virtualized BMC firmware can be configured to intercept commands related to the hardware component and to process the intercepted commands instead of transferring them to the second virtualized BMC firmware.

Figure 5A:
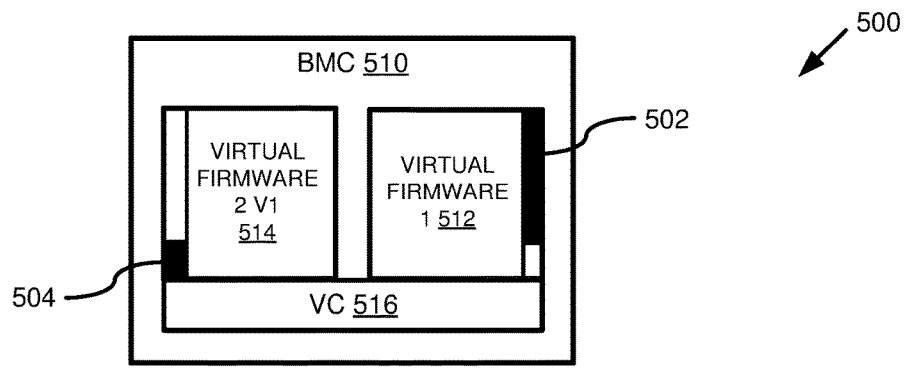
FIGS. 5A-C are system diagrams depicting example transitions from one virtualized BMC firmware to another virtualized BMC firmware.
Figure 5B:
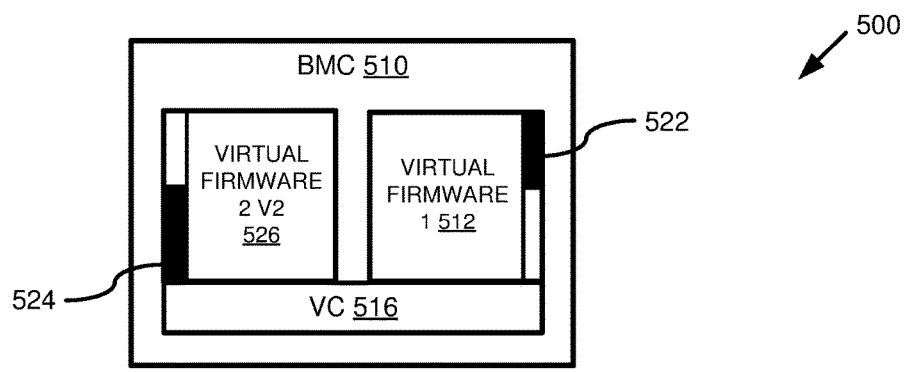
Figure 5C:
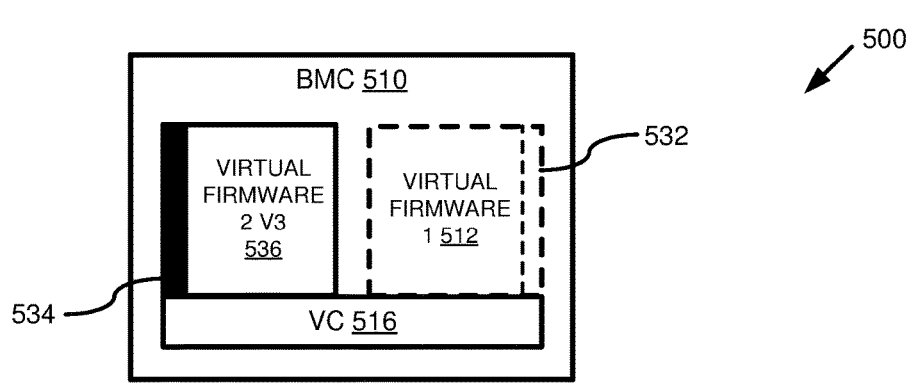

FIGS. 5A-C are system diagrams depicting example transitions from one virtualized BMC firmware to another virtualized BMC firmware.

FIG. 5A depicts an example system 500 comprising a board management controller (BMC) 510 comprising a virtualization controller 516. The virtualization controller 516 is configured to run two virtualized BMC firmware instances: a first virtualized firmware 512 and a second virtualized firmware 514. The first virtualized firmware 512 is an older BMC firmware that previously managed all of the functionality for the BMC 510. The second virtualized firmware 514 is a first version of a newer BMC firmware that has been deployed to the BMC using techniques described herein. The second virtualized firmware 514 is configured to replace some, but not all, of the functionality of the first virtualized firmware 512. Bars 502 and 504 depict relative portions of BMC firmware functionality implemented by the first virtualized firmware 512 and the second virtualized firmware 514, respectively. The bars 502 and 504 indicate that the second virtualized firmware 514 implements a relatively small amount of the BMC functionality (e.g., representing support for a small number of features and/or control of a relatively small percentage of hardware components controlled by the BMC 510), while most of the BMC functionality is still provided by the first virtualized firmware 512.

FIG. 5B depicts the example system 500 after an update has been applied to replace the first version of second virtualized firmware 514 with a second version of the second virtualized firmware 526. The bars 524 and 522 indicate that the new, second version of the second virtualized firmware 526 implements an increased amount of the BMC functionality for the BMC 510, and that the first virtualized firmware 512 now provides less of the BMC functionality than it did in the scenario depicted in FIG. 5A. In at least some embodiments, the second version of the second virtualized firmware 526 can be configured to disable the first virtualized firmware 512's support for one or more BMC features which the second version of the second virtualized firmware 526 now provides.

In at least some embodiments, an update can be applied to replace the previous version of first virtualized firmware 512 with a new version of the first virtual firmware (not shown). For example, the first virtualized firmware 512 can be replaced by a new version of the first virtualized firmware, wherein the first virtualized firmware's control of one or more hardware resources that are controlled by the second version of the second virtualized firmware 526 and/or support of one or more BMC features that are supported by the second version of the second virtualized firmware 526 has been disabled. Additionally or alternatively, an update to the first virtualized firmware can be applied to fix one or more bugs in the first virtualized firmware 512 and/or to enhance one or more features of the first virtualized firmware 512.

FIG. 5C depicts the example system 500, after another update has been applied to replace the second version of the second virtualized firmware 526 with a third version of the second virtualized firmware 536. The bars 534 and 532 indicate that the third version of the second virtualized firmware 536 now provides all of the BMC functionality for the BMC 510, and that the first virtualized firmware 512 is no longer used for any BMC functionality. Optionally, the first virtualized firmware 512 can be disabled once it is determined that it is no longer used to provide any BMC functionality. In a particular embodiment, the third version of the second virtualized firmware 536 can be configured to disable the first virtualized firmware 512 and/or to prevent the first virtualized firmware 512 from being launched by the virtualization controller 516. For example, the third version of the second virtualized firmware 536 can be configured to update a field stored in a memory or storage accessible by the BMC 510 that indicates that the first virtualized firmware 512 should not be launched. The virtualization controller 516 can be configured to inspect the value of the field before launching the first virtualized firmware 512. This can require the virtualization controller 516 to be configured to launch the second virtualized firmware before launching the first virtualized firmware 512.

In a different or further embodiment, a shell script (or some other set of executable instructions) can be executed as part of a boot process of the BMC 510 to launch the first virtualized firmware 512 and the currently installed version of the second virtualized firmware (e.g., 536). Such a shell script can be configured to launch the currently installed version of the second virtualized firmware before launching the first virtualized firmware 512. The shell script can be further configured to conditionally launch the first virtualized firmware 512 based on a value of a field that can be set by the currently installed version of the second virtualized firmware. Alternatively, a virtualized firmware update (such as the update that replaced the second version of the second virtualized firmware 526 with the third version of the second virtualized firmware 536) can be configured to replace the shell script with an updated script that does not launch the first virtualized firmware 512.

FIGS. 6A-D are system diagrams depicting an example transition from running a first BMC firmware natively to running a second version of the BMC firmware natively by using BMC firmware virtualization.

Figure 6A:
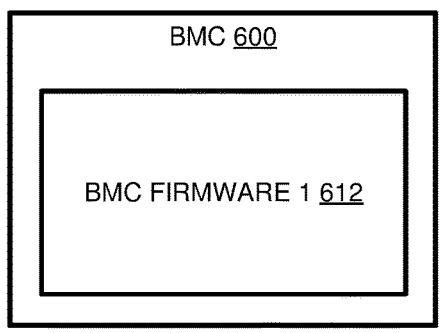
FIGS. 6A-D are system diagrams depicting an example transition from running a first version of a BMC firmware natively to running a second version of the BMC firmware natively by using BMC firmware virtualization.

FIG. 6A depicts an example BMC 600 comprising a first BMC firmware 612 running natively. Running the first BMC firmware 612 natively can comprise executing an image of the first BMC firmware 612 by a BMC processor of the BMC 600 (not shown). The image of the first BMC firmware 612 can be stored in a memory and/or storage that can be accessed by the BMC 600. The image of the first BMC firmware 612 can comprise executable instructions for an operating system kernel and executable instructions for performing BMC functionality. When power is supplied to the BMC 600, the BMC 600 can access a storage location of the BMC firmware image storing boot instructions for the first BMC firmware 612. By loading and executing the boot instructions, the BMC 600 can load the first BMC firmware 612 and run it natively.

Figure 6B:
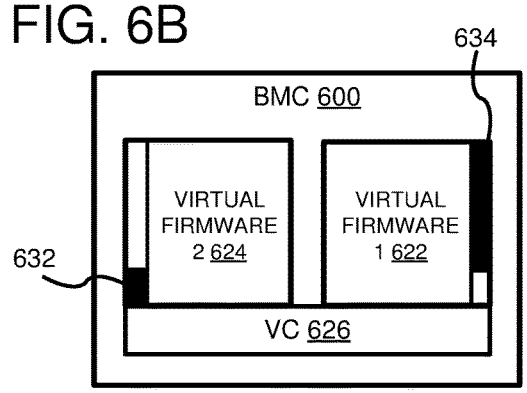

FIG. 6B depicts the example BMC 600 comprising a virtualization controller 626, a first virtualized firmware 622 and a second virtualized firmware 624. The first virtualized firmware 622 is a virtualized instance of the first BMC firmware 612. The second virtualized firmware 624 is a virtualized instance of a new BMC firmware configured to replace some of the functionality of the first BMC firmware 612. The bars 632 and 634 depict relative amounts of BMC functionality performed by each of the virtualized firmware instances. The bar 632 indicates that the second virtualized firmware 624 performs a relatively small amount of the BMC functionality, and the bar 634 indicates that the first virtualized firmware 622 performs most of the BMC functionality.

By running a virtualized instance of an old BMC firmware (622) side-by-side with a virtualized instance of a new BMC firmware (624), new BMC functionality can be introduced without a wholesale replacement of the old BMC firmware. A firmware image comprising instructions for running an operating system kernel, both the BMC firmware instances, and the virtualization controller 626 can be deployed to the memory and/or storage that can be accessed by the BMC 600. In at least one embodiment, the deployed firmware image overwrites the previous image of the first BMC firmware 612. When loaded and executed by the BMC 600, the instructions can cause the BMC 600 to launch the virtualization controller 626 and run the first virtualized firmware 622 and the second virtualized firmware 624 in separate virtual machines or virtualization containers. Using techniques described herein, the virtualized firmware 622 and the virtualized firmware 624 can be used to perform supported BMC functionality.

Figure 6C:
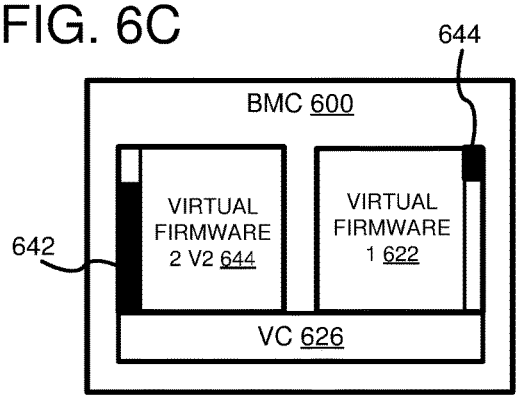

As new features are added to the new BMC firmware, new versions of the second virtualized firmware can be deployed to the BMC 600. FIG. 6C depicts the example BMC 600 comprising the virtualization controller 626, the first virtualized firmware 622, and a new version of the second virtualized firmware 644. The virtualized firmware 644 is a virtualized instance of an updated version of the new BMC firmware that is configured to replace additional functionality of the first BMC firmware 612. The bars 642 and 644 depict relative amounts of BMC functionality performed by each of the virtualized firmware instances. The bar 642 indicates that the new version of the second virtualized firmware 644 performs most of the BMC functionality, while the first virtualized firmware 622 now performs a relatively small amount of the BMC functionality. In at least some embodiments, the new version of the second virtualized firmware 644 can be deployed to the BMC 600. The BMC 600 can be configured to receive the new version of the second virtualized firmware 644 and to replace a previous version of the second virtualized firmware (e.g., 624) with the new version of the second virtualized firmware 644. In a particular embodiment, the previous version of the second virtualized firmware (e.g., 624) can be configured to receive an image of the new version of the second virtualized firmware and replace an image of the previous version of the second virtualized firmware with in a storage and/or memory that is accessible by the BMC 600 with the image of the new version of the second virtualized firmware.

Additionally or alternatively, a new firmware image can be deployed that comprises the new version of the second virtualized firmware 644, the virtualized firmware 622, the virtualization controller 626, and the operating system kernel. A previous firmware image for the BMC 600 can be overwritten by the new firmware image. When the BMC 600 is restarted, it can load the new firmware image and launch the new version of the second virtualized firmware 644 and the first virtualized firmware 622.

Figure 6D:
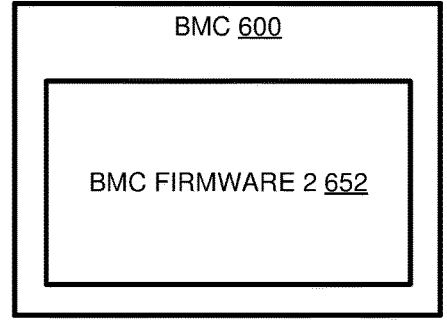

FIG. 6D depicts the example BMC 600 running a version of the new BMC firmware natively. Once all of the functionality of the first BMC firmware 612 has been replaced by the new BMC firmware, the first and second virtualized firmware instances, and the virtualization controller 626, can be replaced with a version of the new BMC firmware (652) that supports all of the BMC functionality. The image of the new BMC firmware 652 can be stored in the memory and/or storage that can be accessed by the BMC 600. The image of the new BMC firmware 652 can comprise executable instructions for the operating system kernel and executable instructions for performing the new BMC functionality. When power is supplied to the BMC 600, the BMC 600 can access a storage location of the BMC firmware image storing boot instructions for the new BMC firmware 652. By loading and executing the boot instructions, the BMC 600 can load the new BMC firmware 652 and run it natively.

Figure 7:
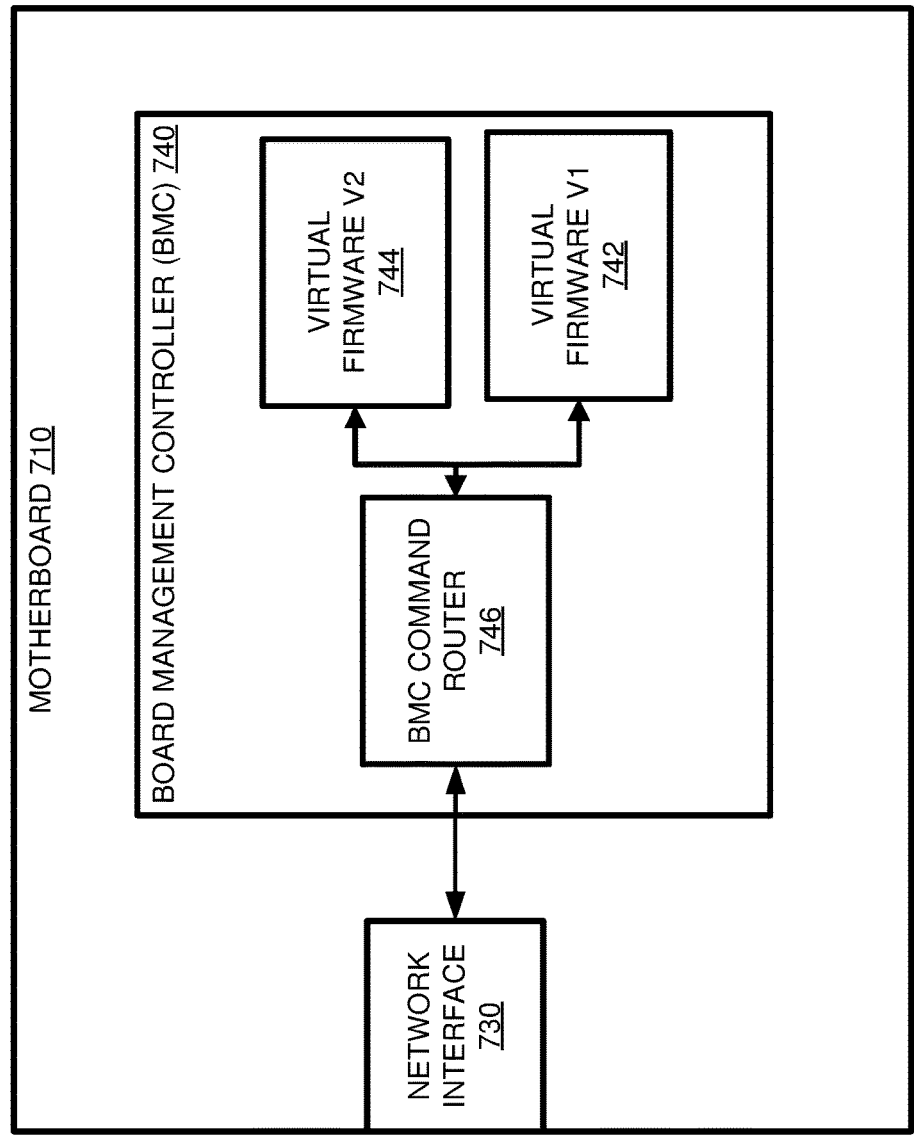
FIG. 7 is a system diagram showing an example system configured to run multiple virtualized firmware instances in a BMC using a BMC command router.

FIG. 7 is a system diagram showing an example system 700 configured to run multiple virtualized firmware instances in a BMC 740 using a BMC command router 746. The example system 700 includes a motherboard 710 comprising a network interface 730 and the BMC 740. The BMC 740 comprises a first virtualized firmware 742 and a second virtualized firmware 744. The BMC 740 further comprises the BMC command router 746, which can be implemented in hardware or a combination of hardware and firmware. The BMC command router 746 is configured to receive BMC commands (such as IPMI commands) and to route the receive commands to the appropriate virtualized firmware for processing. The BMC command router 746 can also be configured to receive alert messages from the first virtualized firmware 742 and the second virtualized firmware 744, and to transmit the received alerts to a system administrator.

The first virtualized firmware 742 and the second virtualized firmware 744 can be configured to perform different hardware related functions for the BMC 740. For example, the motherboard 710 can be connected to multiple hardware components (not shown) that can be controlled by the BMC 740. One or more of these hardware components can be controlled by the second virtualized firmware 744 and a different one or more of the hardware components can be controlled by the first virtualized firmware 742. In a particular embodiment, the second virtualized firmware 744 is a virtualized instance of a new BMC firmware and the first virtualized firmware 742 is a virtualized instance of an older BMC firmware. The second virtualized firmware 744 can be configured to support a subset of the hardware components managed by the BMC 740, while the first virtual firmware 742, can be configured to support all of the hardware components not supported by the second virtualized firmware 744.

The BMC command router 746 can be configured to analyze the command received by the network interface 730 to determine which of the two virtualized firmware instances 742 and 744 supports the received command. After identifying which virtualized firmware instance supports the received command, the BMC router 746 can transmit the command to the identified virtualized firmware instance. In at least one embodiment, the BMC command router 746 is aware of which hardware components are managed by each of the two virtualized firmware instances 742 and 744. The BMC command router 746 can determine one or more hardware components that are targeted by the received command. The BMC command router can then determine which virtualized firmware instance controls the one or more targeted hardware components, and can transmit the received command to the controlling virtualized firmware instance.

Additionally or alternatively, the BMC command router 746 can determine which virtualized firmware instance supports the received command by accessing a table containing supported commands and associated virtual firmware instances. The table containing supported commands can be stored in a storage and/or memory accessible by the BMC 740. Entries in the table can list unique command identifiers and associated virtualized firmware instance identifiers. The BMC command router 746 can analyze the received command to locate the command's command identifier. The BMC command router 746 can look up an entry in the supported command table that contains the command identifier for the received command and can retrieve a virtualized firmware identifier in the table entry that is associated with the command identifier for the received command. The BMC command router 746 can then transmit the received command to the virtualized firmware instance associated with the virtualized firmware identifier retrieved from the table. In embodiments where one of the virtualized firmware instances is updated (such as where the second virtualized firmware 744 is a virtualized instance of a newer firmware and is updated to replace additional functionality of the first virtualized firmware 742), the table can be updated to associate one or more commands with the updated virtualized firmware instance.

In the example system 700, neither of the virtualized firmware instances 742 and 744 need to be aware of the other's existence. Each of the virtualized firmware instances 742 and 744 can be configured to operate as if it were directly connected to the network interface 730. The BMC command router 746 can thus effectively isolate the virtualized firmware instances 742 and 744 from one another.

Figure 8:
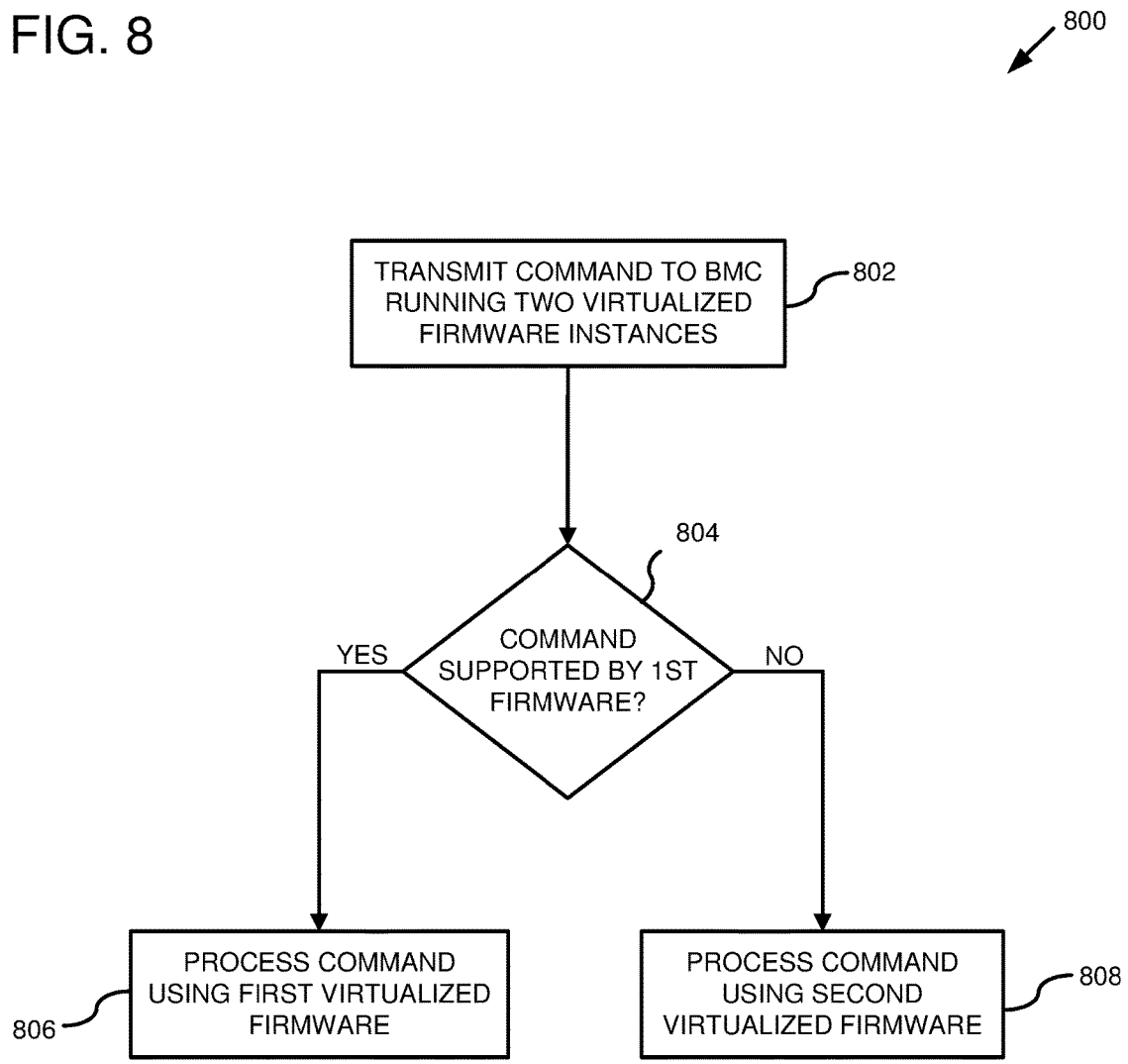
FIG. 8 is a flowchart of an example method for routing commands to different virtualized firmware instances in a BMC.

FIG. 8 is a flowchart of an example method 800 for routing commands to different virtualized firmware instances in a BMC. Any of the example systems described herein can be used to perform the example method 800.

At 802, a command is transmitted to a BMC running a first virtualized firmware instance and a second virtualized firmware instance side-by-side. The two separate virtualized firmware instances can be different BMC firmware instances that are running in separate virtual machines or separate virtualization containers. The separate virtual machines or separate virtualization containers can be managed by a same virtualization container running in the BMC.

The separate virtualized firmware instances can be configured to support different types of BMC commands (such as IPMI commands, etc.). For example, the separate virtualized firmware instances can be configured to monitor different sensors connected to the BMC and to process commands related to the different sensors. Additionally or alternatively, separate virtualized firmware instances can be configured to support different out-of-band management protocols. Additionally or alternatively, the first virtualized firmware instance can comprise a replacement implementation for one or more of the features of the second virtualized firmware instance. For example, the second virtualized firmware instance can be a virtualized instance of an older BMC firmware and the first virtualized firmware instance can be a virtualized instance of a newer BMC firmware that comprises a partial replacement for the older BMC firmware.

At 804, the command is analyzed to determine whether it is supported by the first virtualized firmware instance running on the BMC. Analyzing the command can comprise inspecting a command identifier of the command and determining whether the command identifier is in a list of commands that are supported by the first virtualized firmware instance. Additionally or alternatively, a protocol with which the command is associated can be identified and a list of protocols supported by the first virtualized firmware instance can be inspected to determine whether or not the identified protocol is supported by the first virtualized firmware instance. Alternatively or additionally, one or more hardware resources can be identified that are targeted by the received command, and a list of hardware resources controlled by the first virtualized firmware instance can be inspected to determine whether or not the one or more targeted hardware resources are controlled by the first virtualized firmware instance.

In at least one embodiment, the command is provided to the first virtualized firmware instance and the first virtualized firmware instance determines whether or not it supports the command. Alternatively, a BMC command router can be used to determine whether the command is supported by the first virtualized firmware instance. The BMC command router can be included as part of the BMC or, alternatively, as part of the separate service connected to the BMC via a computer network.

If the command is supported by the first virtualized firmware instance, then at 806 the command is processed using the first virtualized firmware instance. If the command is not supported by the first virtualized firmware instance, then at 808 the command is processed using a second virtualized firmware instance. In an embodiment where the first virtualized firmware instance determines whether or not it supports the command, the first virtualized firmware instance can be configured to transmit the command to the second virtualized firmware instance if it does not support it. In such an embodiment, the first virtualized firmware instance can be configured to receive a response message from the second virtualized firmware instance after the second virtualized firmware instance has processed the command. In an embodiment comprising a BMC command router, the BMC command router can transmit the command to the first virtualized firmware instance if it determines that the command is supported by the first virtualized firmware instance, and can transmit the command to the second virtualized firmware instance if it determines that the command is not supported by the first virtualized firmware instance.

Figure 9:
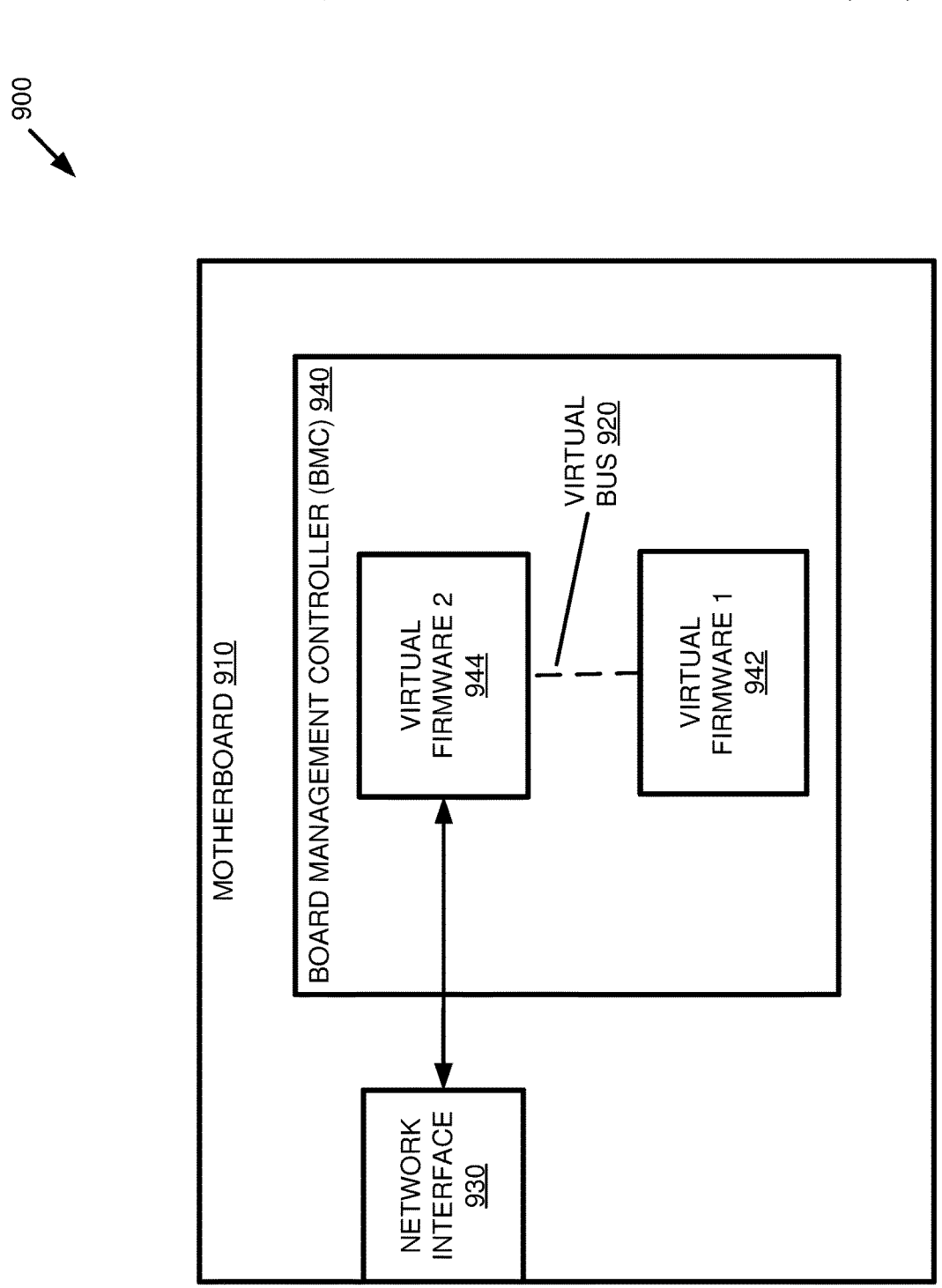
FIG. 9 is a system diagram showing an example system configured to run multiple virtualized firmware instances in a BMC using a virtual bus.

FIG. 9 is a system diagram depicting an example system 900 configured to run multiple virtualized firmware instances in a BMC 940 using a virtual bus 920. The example system 900 comprises a motherboard 910 which includes a network interface 930 and the BMC 940. Using techniques described herein, the BMC 940 is configured to operate multiple virtualized BMC firmware instances: virtualized firmware 1 942 and virtualized firmware 2 944.

The BMC 940 is configured to connect the virtualized firmware 2 944 to the virtualized firmware 1 942 using the virtual bus 920. The virtual bus 920 can be emulated by a virtualization controller (not shown). The virtualized firmware 2 944 and the virtualized firmware 1 942 can use the virtual bus to communicate as if they were connected by a physical communications bus. A virtual bus manager (such as a virtualization controller or a separate service running on the BMC 940) can be configured to receive a message from one virtualized firmware via an emulated bus connection and transmit the message to the other virtualized firmware via another emulated bus connection. In at least some embodiments, the virtual bus 920 is an emulation of an IPMI bus.

The virtualized firmware 2 944 can be configured to receive a command (such as an IPMI command) via the network interface 930. For example, the BMC 940 can be configured to run a host operating system with access to the network interface 930. The virtualization controller can be configured to expose the BMC host operating system's network interface connection to the virtualized firmware 2 944.

Upon receipt of the command via the network interface 930, the virtualized firmware 2 944 can inspect the command to determine whether or not it supports the command. If the virtual firmware 2 944 does not support the command, it can transmit the command to the virtualized firmware 1 942 via the virtual bus 920. The virtual firmware 942 can be configured to receive the command via the virtual bus 920, process the command, and transmit a response to the virtual firmware 2 944 via the virtual bus 920. The virtualized firmware 2 944 can receive the response message from the virtualized firmware 1 942 and can transmit all or part of the response message via the network interface 930. If the virtual firmware 2 and 944 does supports the command, it can process the command and transmit a response via the network interface 930.

In at least some embodiments, the virtualized firmware 1 942 can be configured to monitor one or more hardware components (such as sensors connected to the motherboard 910) and to transmit alarm messages to the virtualized firmware 2 944 via the virtual bus 920. The virtualized firmware 2 944 can be configured to receive such alarm messages and to transmit them to a system administrator or monitoring service via the network interface 930.

In at least some embodiments, the virtualized firmware 1 942 does not need to be aware of the existence of the virtualized firmware 2 944. The virtualized firmware 1 942 can be configured to operate as if its emulated connection to the virtual bus 920 is a connection to the network interface 930. Using such a configuration, the virtualized firmware 2 944 can be implemented as an intermediary between the network interface 930 and the virtualized firmware 1 942 without modification to the virtualized firmware 1 942.

Figure 10:
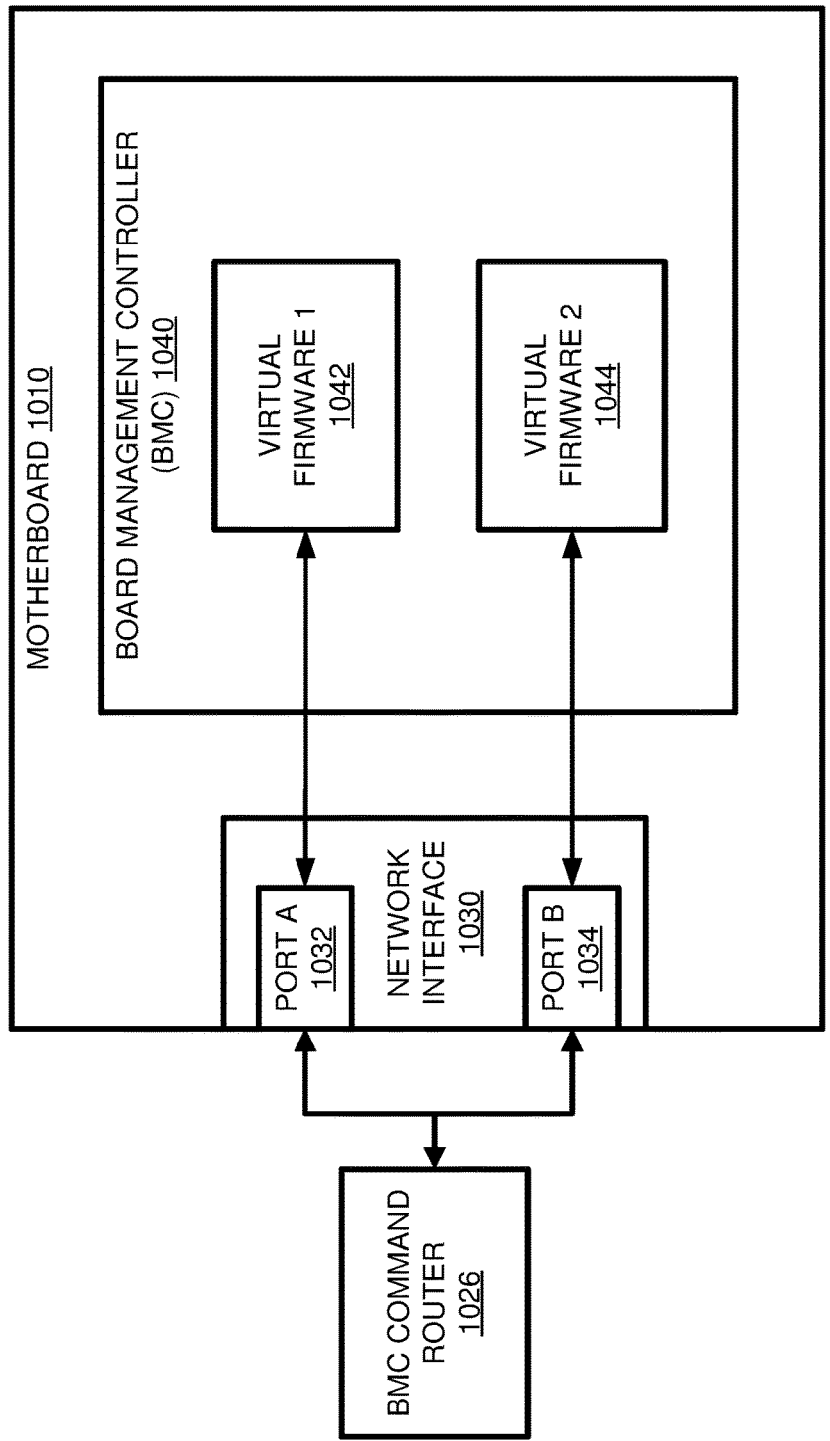
FIG. 10 is a system diagram showing an example system configured to run multiple virtualized firmware instances in a BMC using multiple ports of a motherboard network interface.

FIG. 10 is a system diagram depicting an example system 1000 configured to run multiple virtualized firmware instances in a BMC 1040, wherein the multiple virtualized firmware instances are connected to separate ports of a motherboard network interface 1030.

The example system 1000 comprises a motherboard 1010 that includes a network interface 1030 and a BMC 1040. The network interface 1030 comprises multiple communication ports (e.g., 1032 and 1034). The BMC 1040 comprises a first virtualized firmware 1042 and a second virtualized firmware 1044. The first virtualized firmware 1042 is connected to port 1032 of the network interface 1030. The second virtualized firmware 1044 is connected to the port 1034 of the network interface 1030. In at least one embodiment, the ports 1032 and 1034 are separate physical communication ports of the network interface 1030. In a different embodiment, the ports 1032 and 1034 are logical ports that can be identified in data packets using one or more communication protocols (such as TCP, etc.).

In an embodiment where the ports 1032 and 1034 are logical ports, a virtualization controller (not shown) managing the execution of the first virtualized firmware 1042 and the second virtualized firmware 1044 can be configured to route messages transmitted via the logical port 1032 to the first virtualized firmware 1042 and to route messages transmitted via a logical port 1034 to the second virtualized firmware 1044.

The example system 1000 further comprises a BMC command router 1026 that is configured to communicate with the first virtualized firmware 1042 via the port 1032 and to communicate with the second virtualized firmware 1044 via the port 1034. The BMC command router 1026 can comprise one or more hardware and/or software components of a computing device (not shown). The BMC command router 1026 and the motherboard 1010 can, in some embodiments, be contained within a same computing device. In at least some other embodiments, the BMC command router 1026 can be part of a computing device separate from the motherboard 1010. In a particular embodiment, the BMC command router 1026 can be part of an out-of-band computer system management program configured to administer a computing device comprising the motherboard 1010 by transmitting commands (e.g., IMPI commands) to the BMC 1040 via one or more of the ports of the network interface 1030 (e.g., 1032 and 1034).

The BMC command router 1026 can be configured to determine which of the virtualized firmware instances 1042 and 1044 supports a given command and to transmit the given command to a port of the network interface 1030 associated with the supporting virtualized firmware instance. For example, the BMC command router 1026 can determine that a given command is supported by the virtualized firmware 1042. The BMC command router 1026 can determine that the port 1032 of the network interface 1030 is associated with the virtualized firmware 1042 and can then transmit the given command to the port 1032 over a computer network. When the given command is received at the network interface 1030 (either via a physical port 1032 or comprising a logical port 1032 identifier) the command can be transmitted to the virtualized firmware 1042. Alternatively, if the BMC command router 1026 determines that the command is not supported by the first virtualized firmware 1042, the BMC command router 1026 can identify the port 1034 associated with the second virtualized firmware 1044 and can transmit the command via the port 1034 to the second virtualized firmware 1044.

Figure 11:
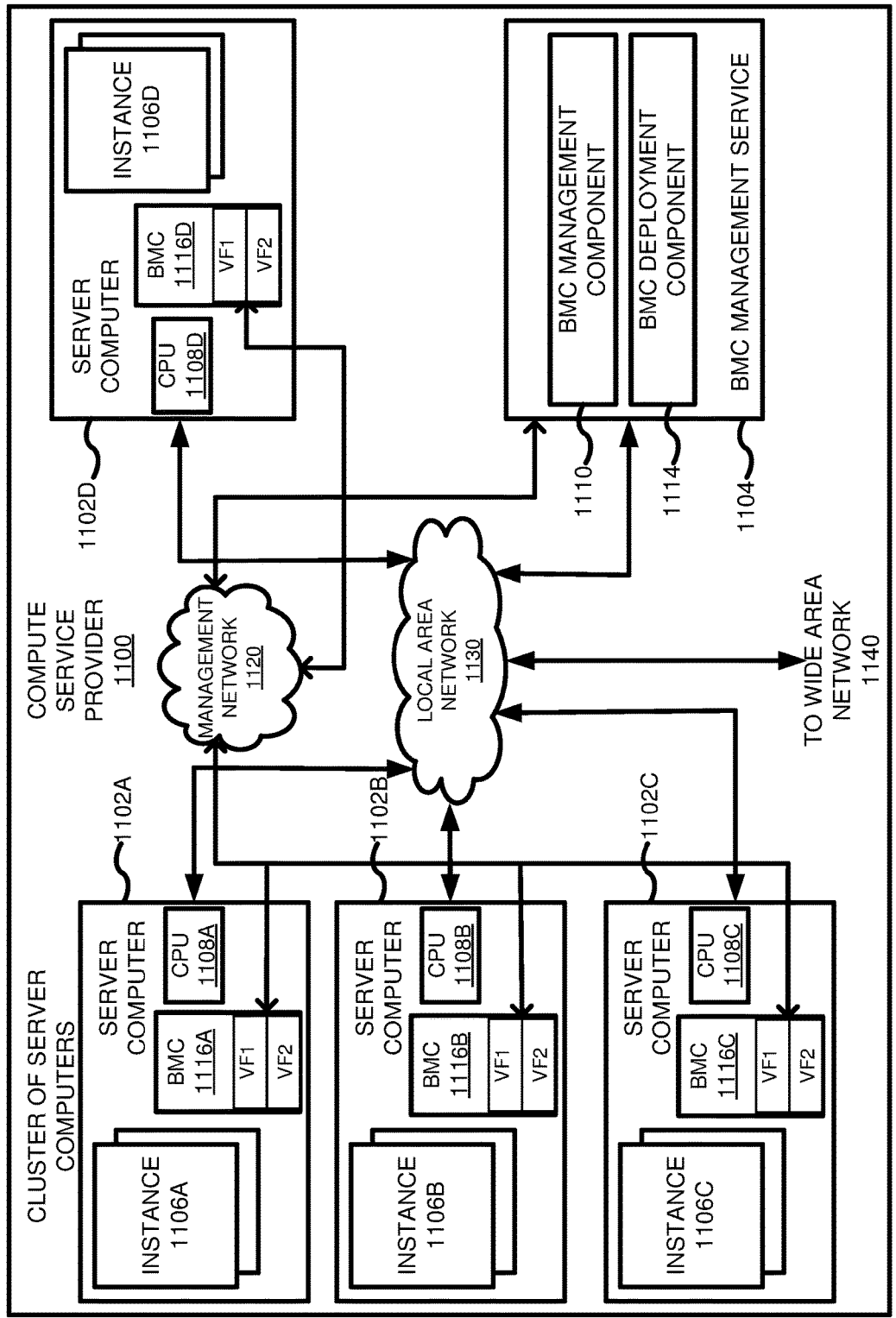
FIG. 11 is a system diagram showing an example network-based compute service provider.

FIG. 11 is a system diagram showing an example network-based compute service provider 1100 that illustrates one environment in which embodiments described herein can be used. By way of background, the compute service provider 1100 (i.e., the cloud provider) is capable of delivery of computing and storage capacity as a service to a community of end recipients.

In an example embodiment, the compute service provider can be established for an organization by or on behalf of the organization. That is, the compute service provider 1100 may offer a "private cloud environment." In another embodiment, the compute service provider 1100 supports a multi-tenant environment, wherein a plurality of customers operate independently (i.e., a public cloud environment). Generally speaking, the compute service provider 1100 can provide the following models: Infrastructure as a Service ("IaaS"), Platform as a Service ("PaaS"), and/or Software as a Service ("SaaS"). Other models can be provided. For the IaaS model, the compute service provider 1100 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 1100 using networked client devices, such as desktop computers, laptops, tablets, smartphones, etc. running web browsers or other lightweight client applications. Those skilled in the art will recognize that the compute service provider 1100 can be described as a "cloud" environment.

The particular illustrated compute service provider 1100 includes a plurality of server computers 1102A-1102D. While only four server computers are shown, any number can be used, and large centers can include thousands of server computers. The server computers 1102A-1102D can provide computing resources for executing software instances 1106A-1106D. In one embodiment, the instances 1106A-1106D are virtual machines. As known in the art, a virtual machine is an instance of a software implementation of a machine (i.e., a computer) that executes applications like a physical machine. In the example, each of the server computers 1102A-1102D can be configured to execute a hypervisor or another type of program configured to enable the execution of multiple instances 1106 on a single server. For example, each of the servers 1102A-1102D can be configured (e.g., via the hypervisor) to support one or more virtual machine partitions, with each virtual machine partition capable of running a virtual machine instance (e.g., server computer 1102A could be configured to support three virtual machine partitions each running a corresponding virtual machine instance). Additionally, each of the instances 1106 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

The server computers 1102A-1102D can comprise board management controllers (BMCs) 1116A-1116D, respectively. Each of the BMCs 1116 comprise multiple virtualized firmware instances (VF1 and VF2) to initialize, interface with, and control various components within the server computers 1102. The BMCs 1116A-1116D can be communicatively coupled to a management network 1120, where each of the respective management controllers 1116 can have a different IP address. As described herein, the separate virtualized firmware instances can be used to control different components within the server computer 1120 and to support separate BMC functionality.

The BMCs 1116 can communicate with a management service 1104 to receive firmware and/or management commands. Specifically, the management service 1104 can include suitable logic, circuitry, interfaces, and/or code and can be operable to communicate with the BMCs 1116 using the management network 1120. For example, the management service 1104 can transmit virtualized firmware updates to the BMCs 1116 using a BMC deployment component 1114 and/or perform remote administration operations by transmitting BMC commands (such as IPMI commands) to the BMCs using a BMC management component 1110.

The management service 1104 can also be used for monitoring a status of the server computers 1102A-1102D using the respective BMCs 1116A-1116D. For example, the management service 1104 can retrieve operational status information from the virtualized firmware instances running on the BMCs 1116 and other operational status of the system. Based on an analysis of the retrieved status information, the management service 1104 can issue an alert to a system administrator to repair or analyze one or more components of the system. The management service 1104 can be implemented in a dedicated server (similar to the servers 1102A-1102D), or can be implemented as part of a server computer that also performs additional management functions.

A host CPU 1108 can have an independent IP address separate from an IP address of its associated BMC 1116. Thus, management traffic can be communicated over a management plane on the management network 1120 and data traffic can be communicated over a data plane on the local area network 1130. Alternatively, the networks 1120 and 1130 can be combined. The local area network 1130 can be connected to a wide area network (WAN) 1140 so that end-users can access the compute service provider 1100. It should be appreciated that the network topology illustrated in FIG. 11 has been simplified and that many more networks and networking devices can be utilized to interconnect the various computing systems disclosed herein.

Figure 12:
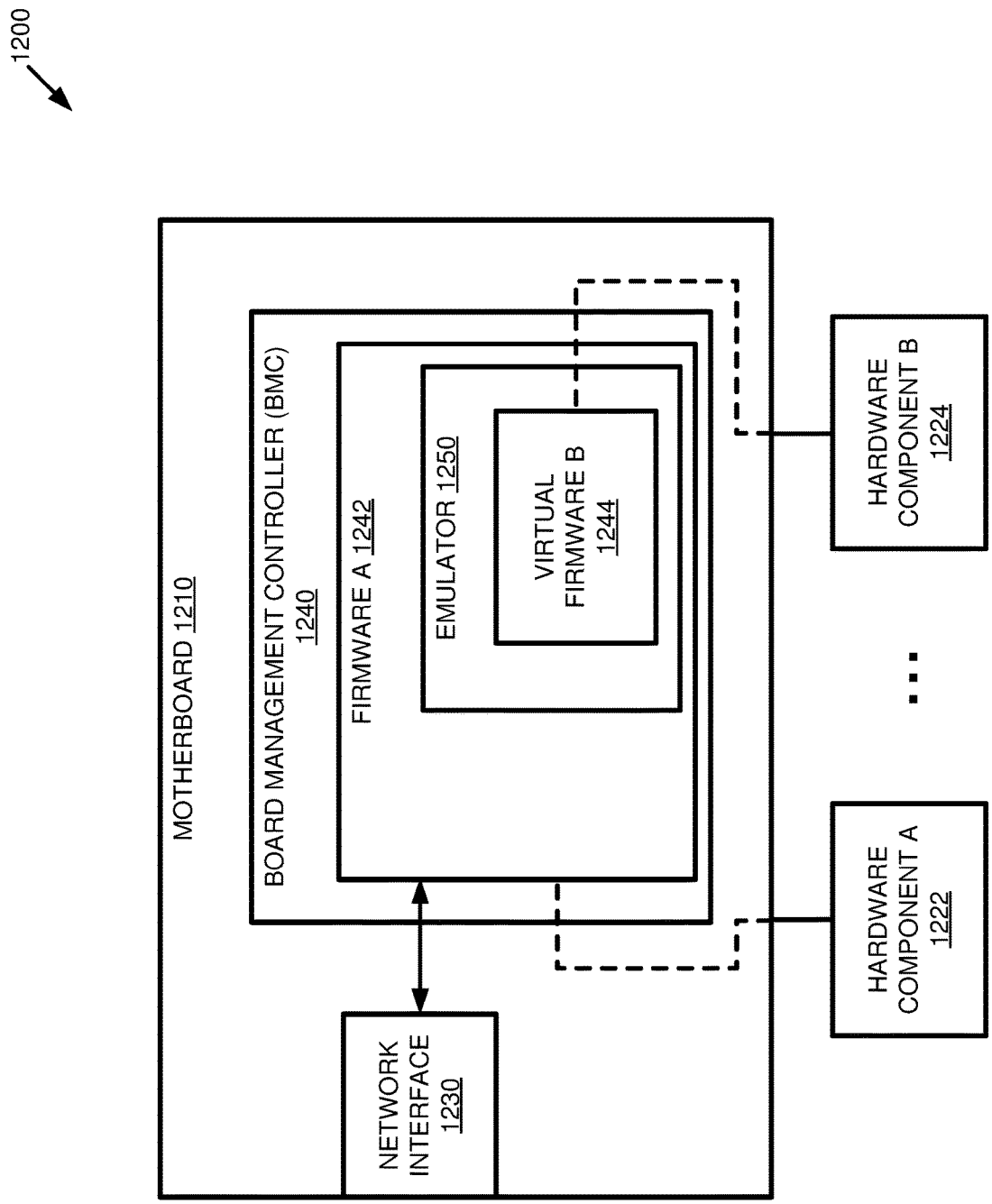
FIG. 12 is a system diagram showing an example system configured to run multiple BMC firmware instances in a BMC using an emulator.

FIG. 12 is a system diagram showing an example system 1200 configured to run multiple BMC firmware instances (e.g., 1242 and 1244) in a BMC 1240 using an emulator 1250. The example system 1200 includes a motherboard 1210 connected to multiple hardware components 1222-1224. The motherboard 110 comprises a network interface 1230 and the BMC 1240. The BMC 1240 comprises a BMC processor (not shown), and is configured to execute an instance 1242 of a first BMC firmware natively. The first BMC firmware instance 1242 comprises the emulator 1250, wherein the emulator 1250 is configured to execute a virtualized instance of a second BMC firmware 1244.

An emulator can comprise one or more software and/or hardware components that enable a host computing system to execute software designed for another computer system, or for the same computer system. For example, the emulator 1250 enables to first BMC firmware instance 1242 to execute the second BMC firmware instance 1244. In some embodiments, the second firmware instance 1244 can be a virtualized instance of a BMC firmware designed to be executed by the BMC 1240. Alternatively, the second firmware instance 1244 can be a virtualized instance of a BMC firmware designed to be executed by a different BMC. In such an embodiment, the emulator 1250 can enable the first firmware instance 1242 to execute the second firmware instance 1244 even though it could not execute natively on the BMC 1240.

The emulator 1250 is depicted in FIG. 12 as being contained by the first firmware instance 1242. However, in at least some embodiments, the emulator 1250 can comprise one or more hardware components (not shown). For example, a hardware emulator (such as an Application Specific Integrated Circuit (ASIC) or Field-Programmable Gate Array (FPGA)) connected to the motherboard 1210 can be used to perform all or part of the emulation of the second firmware instance 1244.

A firmware image for the first firmware instance 1242 can comprise instructions for performing BMC functionality supported by the first firmware instance 1242, a firmware image for the second firmware instance 1244, and instructions for the emulator 1250. The firmware image can be stored in a memory and/or storage (not shown) that can be accessed by the BMC 1240. When power is supplied to the BMC 1240, the BMC 1240 can access a location of the storage and/or memory storing boot instructions for the firmware image for the first firmware instance 1242. The BMC 1240 can be configured to load and execute the boot instructions. Executing the boot instructions can cause the BMC 1240 to instantiate the first firmware instance 1242 and to execute the virtualized version of the second firmware instance 1244 using the emulator 1250.

The first firmware instance 1242 can be configured to monitor and/or control one or more hardware components connected to the motherboard 1210 (e.g., 1222) and to use the virtualized second firmware instance 1244 to monitor and/or control one or more other hardware components connected to the motherboard 1210 (e.g., 1224). The first firmware instance 1242 can be configured to receive and transmit messages using a network interface 1230 of the motherboard 1210. The first firmware instance 1242 can monitor the hardware component 1222 and transmit one or more alerts to a system administrator via the network interface. The second firmware instance 1244 can monitor the hardware component 1224 and transmit an alert to the first firmware instance 1242 via the emulator 1250. For example, the second firmware instance 1244 can monitor a parameter value of the hardware component 1224 and can transmit an alert when the parameter value exceeds a specified level. Example parameter values include a temperature of the hardware component 1224, a fan speed of the hardware component 1224, an average rate of I/O for the hardware component 1224, etc. The first firmware instance 1242 can receive the alert from the emulator 1250 and transmit it to the system administrator via the network interface 1230. In at least some embodiments, the second firmware instance 1244 is not aware that it is running in the emulator 1250. For example, the emulator 1250 can be configured to emulate connections to the one or more hardware components (e.g., 1244) and a network interface. The second firmware instance 1244 can transmit messages and alerts via the emulated network interface as if it were connected to an actual network interface (e.g., 1230).

The transmitted messages and alerts can be routed to the firmware 1242 by the emulator 1250. For example, one or more messaging constructs (such as named pipes) of an operating system running on the BMC 1240 can be used to pass messages between the first firmware instance 1242 and the emulator 1250. In a particular embodiment, the first firmware instance 1242 and the emulator 1250 comprise separate processes that are managed by the BMC operating system and are configured to communicate with each other via the one or more messaging constructs.

The first firmware instance 1242 can be configured to receive a BMC command (such as an IPMI command) via the network interface 1230. The first firmware instance 1242 can analyze the received command to determine whether it supports the command. For example, the first firmware instance can inspect a data structure (such as a table, list, map, etc.) containing commands supported by the first firmware and determine whether the data structure contains the received command. If the first firmware instance 1242 supports the command, it can process the command and transmit a response via the network interface 1230. If the first firmware instance 1242 does not support the command, it can transmit the command to the second firmware instance 1244 via the emulator 1250. The emulator 1250 can transmit the command to the second firmware instance 1244 and receive a response back from the second firmware instance 1244. For example, the emulator 1250 can be configured to route messages to the second firmware instance 1244 and receive response message from the second firmware instance 1244 via an emulated network interface. The emulator 1250 can transmit the response to the first firmware instance 1242, which can transmit all or part of the response via the network interface.

In a particular embodiment, the first firmware instance 1242 is a newer BMC firmware and the second firmware instance 1244 is an older BMC firmware. The first firmware instance 1242 is configured to replace part of the BMC functionality of the second firmware instance 1244 and to use the second firmware instance 1244 running in the emulator 1250 for the BMC functionality that the first firmware instance 1242 has not replaced. Newer versions of the first firmware instance 1242 can be deployed that replace more of the BMC functionality of the second firmware instance 1244. For example, the BMC 1240 can be configured to replace the first firmware instance 1242 with an updated version of the first firmware. The updated version of the first firmware can be configured to monitor and/or control the hardware component 1224 and to disable the ability of the virtualized second firmware instance 1244 to monitor and/or control the hardware component 1244. In a particular embodiment, the updated version of the first firmware is configured to disable an emulated connection between the hardware component 1224 and the virtualized second firmware instance 1244. Once all of the BMC functionality of the second firmware instance 1244 has been replaced, the emulator 1250 can be deactivated.

Figure 13:
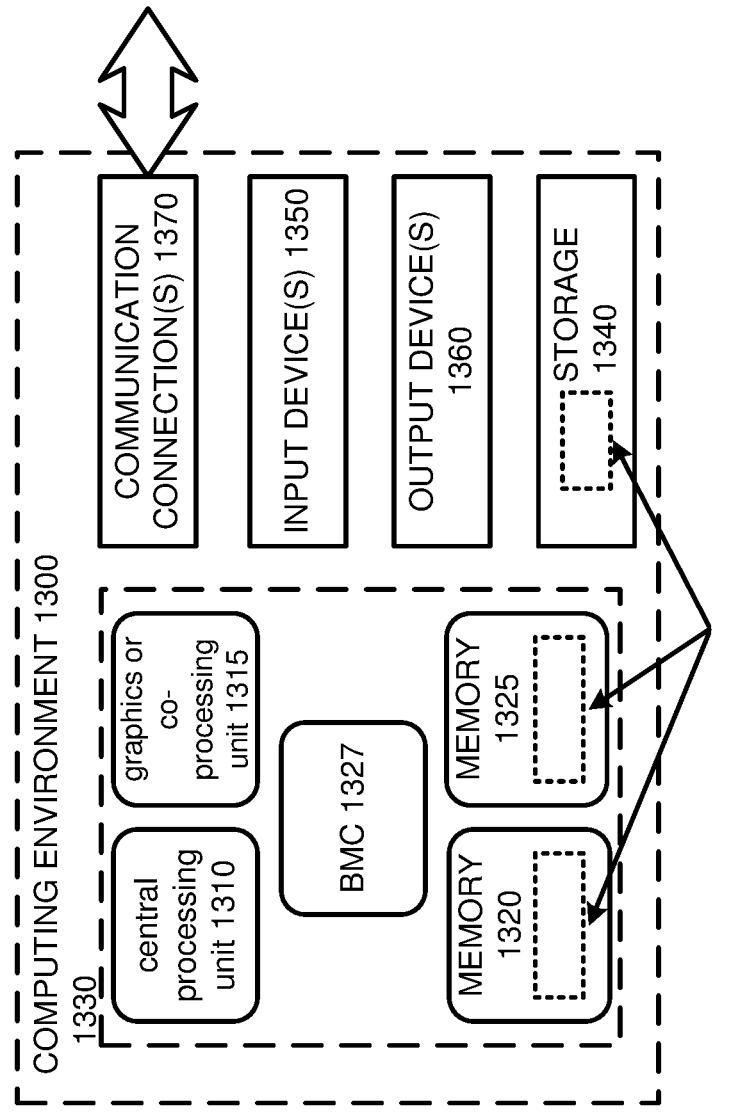
FIG. 13 depicts a generalized example of a suitable computing environment in which the described innovations may be implemented.

FIG. 13 depicts a generalized example of a suitable computing environment 1300 in which the described innovations may be implemented. The computing environment 1300 is not intended to suggest any limitation as to scope of use or functionality, as the innovations may be implemented in diverse general-purpose or special-purpose computing systems. For example, the computing environment 1300 can be any of a variety of computing devices (e.g., desktop computer, laptop computer, server computer, tablet computer, etc.).

With reference to FIG. 13, the computing environment 1300 includes one or more processing units 1310, 1315, memory 1320, 1325, and a board management controller (BMC) 1327. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s).

The BMC 1327 can run multiple virtualized BMC firmware instances as described herein. The BMC 1327 can be configured to access a firmware image, as described herein, stored in one or more of the memory 1320, the memory 1325, and/or the storage 1340.

A computing system may have additional features. For example, the computing environment 1300 includes storage 1340, one or more input devices 1350, one or more output devices 1360, and one or more communication connections 1370. An interconnection mechanism (not shown) such as a bus, controller, or network interconnects the components of the computing environment 1300. Typically, operating system software (not shown) provides an operating environment for other software executing in the computing environment 1300, and coordinates activities of the components of the computing environment 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing environment 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing environment 1300. The output device (s) 1360 may be a display, printer, speaker, CD-writer, or another device that provides output from the computing environment 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. In at least some embodiments, the BMC 1327 is connected to a separate communication connection 1370 than the one or more processing units 1310, 1315.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.*The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system for running multiple board management controller (BMC) firmware instances using emulation, the system comprising:
a computer comprising a motherboard connected to multiple hardware components, wherein the motherboard comprises:
a board management controller (BMC) configured to execute a first BMC firmware instance, wherein:
the first BMC firmware instance comprises an emulator configured to execute a virtualized second BMC firmware instance, wherein the emulator enables the first BMC firmware instance to execute the virtualized second BMC firmware instance; and
the first BMC firmware instance is configured to control a first hardware component, of the multiple hardware components, and to use the emulator to delegate control of a second hardware component, of the multiple hardware components, to the virtualized second BMC firmware instance.

2. The system of claim 1, wherein the first BMC firmware instance is further configured to:
receive a BMC command via a network interface of the motherboard;
determine that the first BMC firmware instance does not support the received command; and
transmit the command to the virtualized second BMC firmware instance using the emulator.

3. The system of claim 2, wherein the emulator is configured to:
receive the command from the first BMC firmware instance; and
use an emulated network interface to route the command to the virtualized second BMC firmware instance.

4. The system of claim 2, wherein the received command is an Intelligent Platform Management Interface command.

5. The system of claim 1, wherein the emulator is configured to emulate a connection between the virtualized second BMC firmware instance and the second hardware component.

6. The system of claim 1, wherein the BMC is further configured to:
replace the first BMC firmware instance with an updated version of the first firmware instance, wherein the updated version of the first firmware instance is configured to:
control the second hardware component; and
disable the virtualized second BMC firmware instance's control of the second hardware component.

7. The system of claim 6, wherein disabling the virtualized second BMC firmware instance's control of the second hardware component comprises disabling an emulated connection between the second hardware component and the virtualized second BMC firmware instance.

8. A system, comprising:
a motherboard comprising a board management controller (BMC), wherein the BMC is configured to:
execute a first BMC firmware, wherein the first BMC firmware is configured to communicate with a first hardware resource attached to the motherboard, and
execute a virtualized second BMC firmware using an emulator, wherein the first BMC firmware comprises the emulator and the emulator enables the first BMC firmware instance to execute the virtualized second BMC firmware instance, and wherein the virtualized second BMC firmware is configured to communicate with a second hardware resource attached to the motherboard.

9. The system of claim 8, wherein:
the virtualized second BMC firmware is further configured to monitor a parameter value of the second hardware resource and to transmit an alert message via an emulated network interface of the emulator when the parameter value exceeds a specified threshold.

10. The system of claim 9, wherein the first BMC firmware is configured to:
receive the alert message from the emulator; and transmit all or part of the alert message via a network interface of the motherboard.

11. The system of claim 8, wherein the first BMC firmware is further configured to:
receive a first BMC command via a network interface of the motherboard;
determine that the first BMC firmware supports the first BMC command;
process the first BMC command;
receive a second BMC command via the network interface of the motherboard;
determine that the first BMC firmware does not support the second BMC command; and
transmit the second BMC command to the virtualized second BMC firmware via the emulator.

12. The system of claim 8, wherein the emulator comprises a process configured to run the virtualized second BMC firmware and to communicate with the first BMC firmware via a messaging construct of an operating system of the BMC.

13. The system of claim 8, wherein the first BMC firmware is configured to:
replace part of BMC functionality of the virtualized second BMC firmware; and
use the virtualized second firmware to provide BMC functionality that the first BMC firmware does not support.

14. The system of claim 8, wherein the BMC is further configured to:
replace the first BMC firmware with an updated version of the first BMC firmware that is configured to communicate with the second hardware resource; and
disable the virtualized second BMC firmware's communication with the second hardware resource.

15. The system of claim 14, wherein disabling the virtualized second BMC firmware's communication with the second hardware resource comprises disabling the emulator.

16. A method, comprising:
running a version of a first BMC firmware natively in a board management controller (BMC), wherein the first firmware comprises an emulator;
running a virtualized version of a second BMC firmware in the same BMC by the version of the first BMC firmware using the emulator;
using the version of the first BMC firmware to communicate with a first hardware component connected to a motherboard; and
using the version of the first BMC firmware to delegate communication with a second hardware component connected to the motherboard to the virtualized version of the second BMC firmware using the emulator.

17. The method of claim 16, further comprising:
detecting, using the virtualized version of the second BMC firmware, that a parameter value of the second hardware component is above a specified threshold;
transmitting an alert message from the virtualized version of the second BMC firmware to the emulator via an emulated network interface of the emulator; and
transmitting the alert message from the emulator to the version of the first BMC firmware.

18. The method of claim 16, wherein the first BMC firmware controls the first hardware component and the second BMC firmware controls the second hardware component, the method further comprising:
receiving an updated version of the first BMC firmware;
replacing the version of the first BMC firmware with the updated version of the first BMC firmware;
using the updated version of the first BMC firmware to control the first hardware component and the second hardware component; and
disabling the virtualized version of the second BMC firmware's control of the second hardware component.

19. The method of claim 18, further comprising:
detecting that the virtualized version of the second BMC firmware is no longer used to perform any BMC functionality; and
disabling the emulator.

20. The method of claim 16, further comprising:
receiving a first BMC command via a network interface of the motherboard;
using the version of the first BMC firmware to determine that the version of the first BMC firmware supports the first BMC command;
using the version of the first BMC firmware to process the first BMC command;
receiving a second BMC command via the network interface of the motherboard;
using the version of the first BMC firmware to determine that the version of the first BMC firmware does not support the second BMC command; and
transmitting the second BMC command via the emulator to the virtualized version of the second BMC firmware.

* * * * *